United States Patent [19]

Thomas et al.

[11] 4,382,364
[45] May 10, 1983

[54] HYDRAULIC BRAKING SYSTEMS FOR VEHICLES

[75] Inventors: Alfred W. Thomas, Koblenz, Fed. Rep. of Germany; Anthony W. Harrison, Birmingham, England

[73] Assignee: Girling Limited, Birmingham, England

[21] Appl. No.: 212,797

[22] Filed: Dec. 4, 1980

Related U.S. Application Data

[63] Continuation-in-part of Ser. No. 7,215, Jan. 29, 1979, abandoned.

[30] Foreign Application Priority Data

Jan. 31, 1978 [GB] United Kingdom ................ 3783/78

[51] Int. Cl.³ .............................................. B60T 7/00
[52] U.S. Cl. ...................................... 60/567; 60/562; 60/579; 60/582; 60/593; 60/581; 417/390
[58] Field of Search ............ 60/547 R, 547 A, 547 B, 60/550, 551, 579, 591, 593, 581, 571, 582, 567; 417/390

[56] References Cited

U.S. PATENT DOCUMENTS

| | | | |
|---|---|---|---|
| 2,680,350 | 6/1954 | Sprague | 60/551 |
| 2,789,510 | 4/1957 | Meynig | 417/402 |
| 2,945,352 | 7/1960 | Stelzer | 60/550 |
| 2,976,849 | 3/1961 | Stelzer | 60/550 |
| 3,250,247 | 5/1966 | Beaman | 60/593 |
| 3,407,601 | 10/1968 | Beck | 60/579 |
| 3,662,548 | 5/1972 | Suzuki | 60/547 A |
| 3,824,792 | 7/1974 | Grabb | 60/547 |
| 4,024,884 | 5/1977 | Prescott | 60/547 |
| 4,110,985 | 9/1978 | Gordon | 60/550 |
| 4,170,876 | 10/1979 | Dits | 60/547 R |
| 4,199,947 | 4/1980 | Mathues | 60/547 R |

FOREIGN PATENT DOCUMENTS

| | | | |
|---|---|---|---|
| 1083767 | 6/1960 | Fed. Rep. of Germany | 60/571 |
| 875606 | 8/1961 | United Kingdom | |

*Primary Examiner*—Abraham Hershkovitz
*Attorney, Agent, or Firm*—Scrivener, Clarke, Scrivener and Johnson

[57] ABSTRACT

In a power braking system for a vehicle a supply of fluid from a power source is utilized to augment the output pressure to be supplied to a brake from a pedal-operated brake control valve assembly. The power source comprises a source of hydraulic fluid of a type different from that which is supplied to the brake from the control valve assembly, and the fluid under pressure from the pressure source is supplied to at least one pressure converter which is adapted to pressurize hydraulic fluid in a sub-system to augment the output pressure from the control valve assembly. The sub-system is provided with hydraulic fluid of a type different from that of the power source, and an hydraulic accumulator is incorporated in a line between the pressure converter and the control valve assembly.

7 Claims, 3 Drawing Figures

HYDRAULIC BRAKING SYSTEMS FOR VEHICLES

SPECIFIC DESCRIPTION

This is a continuation-in-part of our U.S. Pat. Ser. No. 007,215, filed Jan. 29, 1979, now abandoned.

This invention relates to power braking systems for vehicles of the kind in which a supply of fluid from a power source is utilised to augment the output pressure adapted to be supplied to the brake from a pedal-operated brake control valve assembly.

In known power braking systems of the kind set forth it is customary for the control valve assembly to comprise a booster-assisted master cylinder in which pressure from the power source, suitably a pump, is applied to a boost piston in the booster in response to operation of the pedal, and the boost piston acts, either directly or indirectly, on the piston of the master cylinder. Upon failure of the pressure source, the force from the pedal can be transmitted directly to the piston of the master cylinder to operate the master cylinder manually.

When it is considered to be too expensive to provide a pump for use in a braking system alone, use has to be made of a pump which is already available in a vehicle for powering ancilliary equipment, for example the steering and/or self-levelling suspension mechanism, and which is driven by the prime mover of the vehicle. Such a pump may not be entirely suitable to provide a power source for the braking system since the working pressure is usually too low to supply the braking system direct. In addition since the pump runs at high speed with a comparatively high throughput the fluid which it pumps must have very good lubricating qualities which, at the present time, are only met by mineral oils. Thus, to utilise an existing pump effectively, the pressure must be boosted and the mineral oil utilised to operate the master cylinder which, in turn, pressurises hydraulic fluid of a different type to apply the brakes. This hydraulic fluid comprises a vegetable oil and will hereinafter be referred to as "brake-fluid". In addition a safety reserve, suitably an hydraulic accumulator, is necessary to provide a back-up supply of fluid pressure which can be utilised automatically to operate the booster should the pump fail. Hitherto the accumulator has been charged with mineral oil to a pressure lower than the pressure setting of a pump pressure relief valve. Under low temperature conditions the pump is very sluggish after the prime mover of the vehicle has been started. This is because the mineral oil is too viscous to be pumped easily. The only power source immediately available for the braking system comprises the pressure in the accumulator which, because it is also mineral oil, is also too viscous to flow into the booster. The master cylinder can therefore only be operated directly from the pedal as described above by the muscular effort of the driver. This may be impossible in some case because, for direct operation of the piston of the master cylinder from the pedal, mineral oil must be sheared.

According to our invention in a power braking system of the kind set forth the power source comprises a source of hydraulic fluid under pressure which fluid is of a type different from the hydraulic fluid which is supplied to the brake from the brake control valve assembly, and the fluid under pressure from the pressure source is supplied to at least one pressure converter adapted to pressurise hydraulic fluid in a sub-system to augment the output pressure adapted to be supplied to the brakes from the pedal-operated control valve assembly, the sub-system being provided with hydraulic fluid of a type different from that of the power source and incorporating an accumulator in a line between the pressure converter and the control valve assembly.

This enables the accumulator to be charged with fluid which is less viscous at low temperatures than mineral oil which the power source preferably uses so that the brakes can be applied with assistance from stored pressure in the accumulator, even though the power source is inoperative, or is only operative with a limited output.

Conveniently the fluid of the sub-system comprises brake fluid as defined herein which provides power assistance for a number of brake applications, before the pump has warmed up sufficiently to start pumping. When the pedal-operated brake control valve assembly comprises a master cylinder, the master cylinder may be operated normally by a booster responsive to pressure in the sub-system. Alternatively a "booster" as such is not required when the pressure converter embodies or comprises a pressure amplifier since the pressure in the sub-system is sufficient to power the master cylinder directly. Specifically, no boost piston of a diameter greater than that of the piston of the master cylinder need be provided.

The pressure converter may comprise a mechanical connection between the power source and the sub-system.

When two pressure converters are provided they may be interconnected hydraulically, and the first converter may be integral with the pressure source with the second converter integral with the hydraulic accumulator.

Preferably the power source is provided by a pump, in which, in turn, may have been incorporated in a vehicle as a power steering and/or suspension levelling pump, an engine lubricating pump, or an engine cooling pump.

One embodiment of our invention is illustrated in the accompanying drawings in which.

Figure 1:
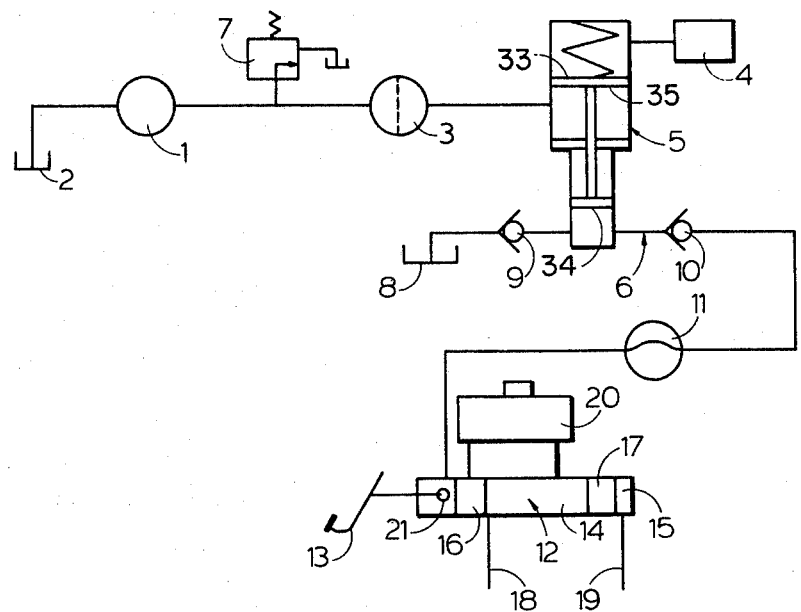
FIG. 1 is a layout of an hydraulic system for a vehicle.

In the hydraulic system illustrated in FIG. 1 of the accompanying drawings a power source comprising a high pressure pump 1, conveniently driven by the prime mover of the vehicle, draws mineral oil from a reservoir 2 and pumps it through a filter 3 to ancillary equipment 4 for example, power steering and/or suspension levelling equipment, or through the engine itself for lubricating or cooling purposes, from whence it is returned to the reservoir.

A pressure converter 5 for providing a pressure source for a braking sub-system 6 is located in the line between the filter 3, and the ancillary equipment 4, and a pressure relief valve 7 is located between the pump 1 and the filter 3. The sub-system 6 comprises a reservoir 8 for brake fluid as defined herein, from which, in response to operation of the pump 1, the pressure converter 5 is operative continuously to draw fluid through a first one-way valve 9 and pump it through a second one-way valve 10 to an hydraulic accumulator 11. The accumulator 11 is located in a line between the second one way valve 10 and a booster assisted tandem master cylinder 12, which is operated by a pedal 13. The master cylinder 12 has primary and secondary pressure spaces 14, 15 in front of primary and secondary pistons 16, 17 for operating sets of brakes on a vehicle through outlets 18 and 19. The master cylinder 12 is of known construction with the pressure spaces 14, 15 supplied with brake fluid as defined herein from a common reservoir 20 through normally-open recuperation valve means which are closed when the master cylinder is operated.

The fluid in the sub-system 6 acts on the primary piston 16 of the master cylinder to define a booster adapted to augment the input force and, in consequence, the outlet pressure in response to operation of a pressure control valve 21 responsive to operation of the pedal 13, which can advance the piston 16 to pressurise the fluid in the space 14.

When the pressure converter 5 comprises or incorporates a pressure amplifier, that pressure can act directly on the primary piston 16 of the master cylinder 12. When no amplifier is present, the master cylinder 12 will be operated by a boost piston of greater area (not shown) and which, in turn, acts on the primary piston 16.

In operation the pump 1 pumps mineral oil to the ancilliary equipment and the pressure from the pump also operates the pressure converter 5 which, in turn, generates a higher pressure in the system 6 by drawing brake fluid from the reservoir 8 and pumping it to the master cylinder 12 to be available to operate the piston 16 when the pressure control valve 21 is operated by the pedal 13. This pressure also pressurises the hydraulic accumulator 11 which stores hydraulic pressure to be available to operate the master cylinder in the event of failure or sluggish operation of the pump 1, for example when the pump starts to operate under cold conditions when the mineral oil in the reservoir 2 has a high viscosity.

The sub-system 6 can be pressurised to a pressure determined by the capacity of the pressure converter 5, but that pressure is limited by the pressure which the pump 1 can generate. This in turn is limited by the pressure relief valve 7.

Figure 2:
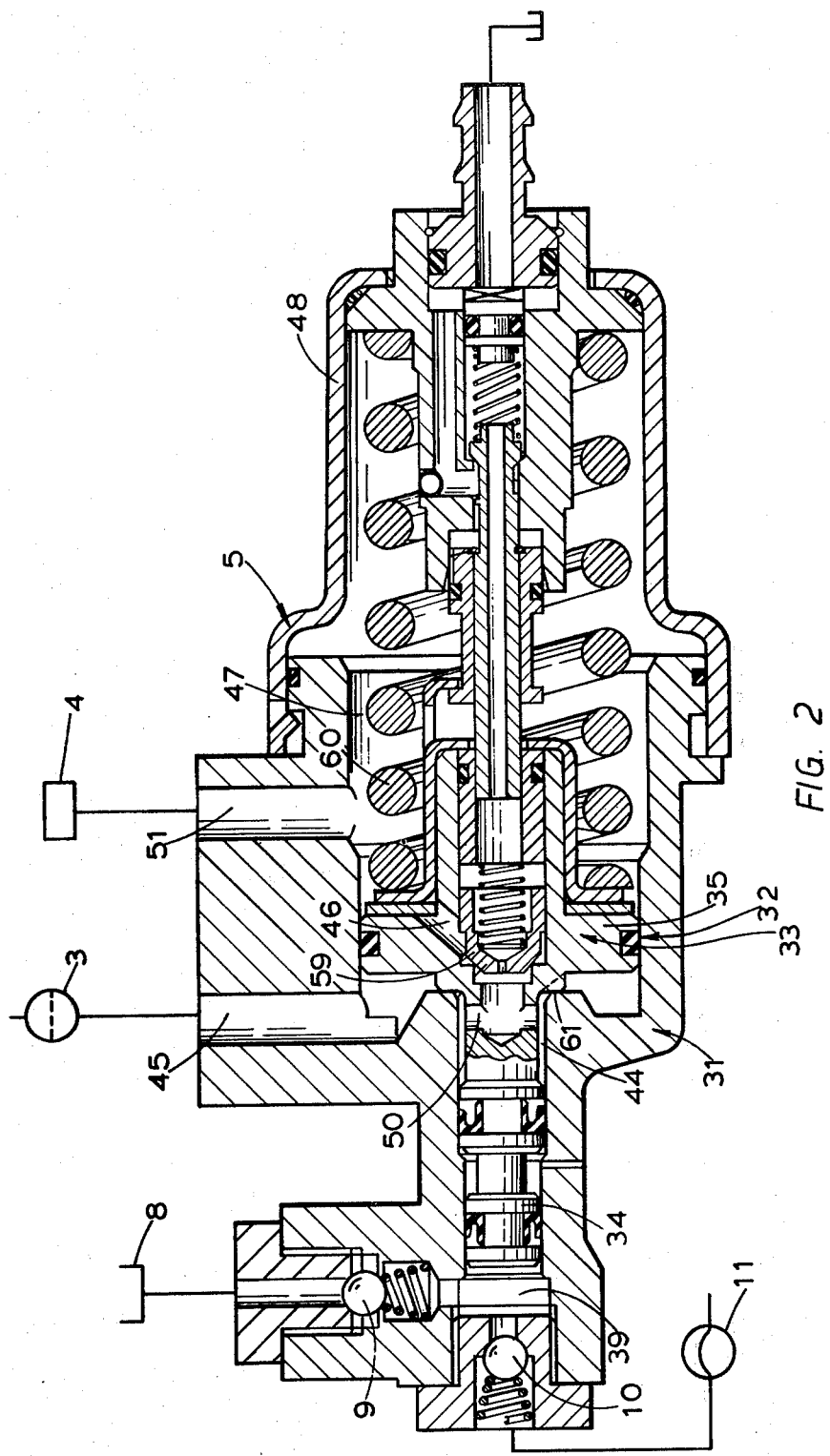
FIG. 2 is a longitudinal section through a pressure converter for use in the system of FIG. 1.

The pressure converter 5 may conveniently be of the kind illustrated in FIG. 2 of the accompanying drawings. As illustrated the pressure converter 5 comprises a housing 31 having a stepped longitudinal bore 32 in which works a differential piston 33 having a portion 34 of smaller diameter and a portion 35 of greater diameter.

A pressure space 39 is defined in the housing in advance of the piston porton 34. The oppositely acting one-way valves 9 and 10 provide communication between the reservoir 8 for hydraulic brake fluid and the pressure space 39, and the space 39 and hydraulic accumulator 11 respectively.

A pressure chamber 44 is defined in the bore between the piston portions 34 and 35, and an inlet passage 45 for connection to the pump 1 leads into the pressure chamber 44. An inclined by-passage 46 in the piston 33 provides communication between the pressure chamber 44 and a supply chamber 47 which is defined by the portion of the bore 32 between the piston portion 35 and a cylindrical shell 48 which projects from the end of the housing 31. The by-pass passage 46 leads into the chamber 44 through a transverse passage 50 in the piston 33. An outlet passage 51 in the housing 31 leads from the supply chamber 47 for connection to the ancillary equipment 4.

A flow-control valve 59 controls communication between the pressure chamber 44 and the supply chamber 47.

In the inoperative position shown in the drawings in which the pump 1 is inoperative, the piston 33 is held by a spring 60 in a retracted position in abutment with a stop face 61 defined by a shoulder at the step in diameter between the portions of the bore 32 which are of different areas.

When the pump 1 starts to operate, pressure from the pump acts on the piston 33 over an area equal to the difference in area between the two portions 34 and 35, initially to urge the piston 33 slightly away from the stop face 61 against the force in the spring 69.

As the pump pressure increases, the piston 33 moves further away from the stop face 61. This movement of the piston 33 is accompanied by fluid being drawn into the pressure space 39 through the one-way valve 9 by the smaller piston portion 34, and fluid being pumped from the supply chamber 47 to the ancilliary equipment 4 through the outlet passage 51 by displacement of the piston 33 in the bore 32.

As the pressure differential acting across opposite sides of the piston portion 35 reduces, the piston 33 is moved in the opposite direction towards the abutment face 61 by the release of the stored energy in the spring 60, and the smaller piston portion 34 pumps fluid from the pressure space 39 into the hydraulic accumulator 11 of the braking system, through the one-way valve 10.

The movement of the piston 33 with respect to the stop face 61 in both directions continues automatically until the the pressure in the hydraulic accumulator, which acts over the area of the piston portion 34 and which is supplied through the one-way valve 10, exceeds the force in the spring 69. At this point the piston 33 is held in a balanced position in which the pump communicates at all times with the ancilliary equipment 4 through the valve 59, which is open, and the by-pass passage 46.

The pressure converter described above acts as a pressure amplifier since it enables a higher pressure to be developed in the hydraulic accumulator by utilising a pump capable of generating only a lower output pressure.

The pressure converter described above forms the subject of our U.S. patent application Ser. No. 021,945 now U.S. Pat. No. 4,261,688 and need not be described further herein.

Figure 3:
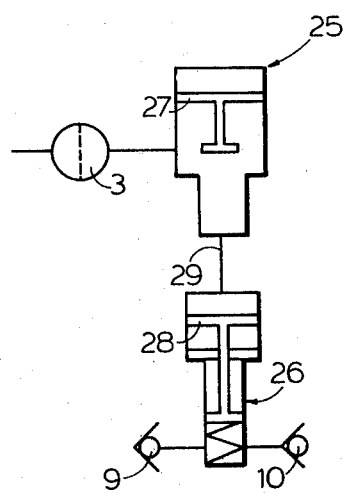
FIG. 3 is a layout of a modified pressure converter for incorporation in the system of FIG. 1.

As shown in FIG. 3, the pressure converter 5 may comprise a pair of pressure converters 25, 26 each incorporating a differential piston 27, 28 and with the differential pistons arranged in tandem. In such a construction an hydraulic connection 29 is provided between adjacent ends of the two pistons 27, 28.

The pump 1 may be integral with the converter 25 and the converter 26 may be integral with the hydraulic accumulator 11.

Each converter 25, 26 may be of the same general type as that described above with reference to FIG. 2.

We claim:

1. A power system for a vehicle comprising at least one pressure converter which takes energy from one system at a first pressure and converts said energy into energy at a second pressure in a second system, said pressure converter being operative when said one system is operative, a power source of hydraulic pressure fluid for supply to said pressure converter, a sub-system provided with hydraulic fluid which is adapted to be pressurised by said pressure converter, said fluid supplied to said converter by said power source being separated from said hydraulic fluid of said sub-system by said pressure converter, a booster operable in response to pressure in said sub-system, for providing an output pressure, a master cylinder to operate ancillary equipment, said output pressure being augmented by said pressure converter by means of a force generated by said booster in response to said pressure in said sub-system, and an hydraulic accumulator incorporated in a line between said converter and said booster.

2. A power system as claimed in claim 1, wherein said sub-system comprises brake fluid as defined herein.

3. A power system as claimed in claim 1, wherein said pressure converter embodies a pressure amplifier.

4. A power system as claimed in claim 1, wherein two pressure converters are provided.

5. A power system as claimed in claim 4, wherein said two pressure converters are arranged in tandem and are interconnected hydraulically.

6. A power system as claimed in claim 1, wherein said power source is provided by a pump.

7. A power system as claimed in claim 1, wherein said hydraulic pressure fluid of said power source is of a first type, and said hydraulic fluid of said sub-system is of a second type different from said first type.

* * * * *